(12) United States Patent
Burkhard et al.

(10) Patent No.: US 9,771,943 B2
(45) Date of Patent: Sep. 26, 2017

(54) SETTING REGULATING ROD LENGTH BY FIXEDLY ATTACHING A REGULATING ROD TO AN END PIECE BY APPLICATION OF A WELD FILLER APPLIED THEREAT THROUGH A WELD WINDOW

(71) Applicant: BorgWarner Inc., Auburn Hills, MI (US)

(72) Inventors: Dirk Burkhard, Mauchenheim (DE); Leif Heidingsfelder, Ramstein (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/396,140

(22) PCT Filed: Apr. 19, 2013

(86) PCT No.: PCT/US2013/037347
§ 371 (c)(1),
(2) Date: Oct. 22, 2014

(87) PCT Pub. No.: WO2013/163030
PCT Pub. Date: Oct. 31, 2013

(65) Prior Publication Data
US 2015/0086266 A1 Mar. 26, 2015

(30) Foreign Application Priority Data
Apr. 27, 2012 (DE) .......................... 10 2012 008 589

(51) Int. Cl.
*F04D 27/00* (2006.01)
*F02B 37/18* (2006.01)

(52) U.S. Cl.
CPC .......... *F04D 27/002* (2013.01); *F02B 37/186* (2013.01); *Y02T 10/144* (2013.01); *Y10T 403/56* (2015.01)

(58) Field of Classification Search
CPC ..... F02B 37/186; F04D 27/002; Y02T 10/144
(Continued)

(56) References Cited

U.S. PATENT DOCUMENTS

2001/0017032 A1   8/2001   Jinnai
2004/0055297 A1   3/2004   Allmang et al.
(Continued)

FOREIGN PATENT DOCUMENTS

| DE | WO 2012078363 A2 * | 6/2012 | ........... F01D 17/165 |
| FR | 2707712 A1 * | 1/1995 | ............ F02B 37/186 |
| KR | 20020046542 A | 6/2002 | |

OTHER PUBLICATIONS

English Abstract of FR 2707712A1.*
International Search Report in International Application No. PCT/US2013/037347 dated Jul. 9, 2013.

*Primary Examiner* — Mark Laurenzi
*Assistant Examiner* — Paul Thiede
(74) *Attorney, Agent, or Firm* — Eric L. Doyle; Stephan A. Pendorf; Patent Central LLC

(57) ABSTRACT

A regulating rod (1) has a rod part (2) which has an end region (3) provided with an external thread and an end piece (4) which has a receiving recess (5). A knurled nut (6) is arranged and guided in the receiving recess (5) and has an internal thread into which the external thread of the externally threaded end region (3) is screwed. The end piece (4) further has a weld window (8) adjacent the knurled nut. Once the length of the regulating rod is adjusted by rotation of the knurled nut, further rotation of the knurled nut is prevented by introducing and filling the weld window with a weld filler such that the knurled nut (6) is non-detachably fixed and thereby the set length of the regulating rod is fixed.

5 Claims, 2 Drawing Sheets

(58) Field of Classification Search
USPC .............. 60/602; 403/299; 415/145, 148, 12
See application file for complete search history.

(56) References Cited

U.S. PATENT DOCUMENTS

| | | |
|---|---|---|
| 2005/0050888 A1 | 3/2005 | McEwan |
| 2009/0092481 A1 | 4/2009 | Genin et al. |
| 2013/0243572 A1* | 9/2013 | Heidingsfelder ..... F01D 17/165 |
| | | 415/12 |

* cited by examiner

SETTING REGULATING ROD LENGTH BY FIXEDLY ATTACHING A REGULATING ROD TO AN END PIECE BY APPLICATION OF A WELD FILLER APPLIED THEREAT THROUGH A WELD WINDOW

BACKGROUND OF THE INVENTION

Field of the Invention

The invention relates to a regulating rod.

Description of the Related Art

In exhaust-gas turbochargers, use is in some cases made of a so-called variable turbine geometry (VTG) for regulating the exhaust-gas mass flow through the turbine. A VTG of said type is actuated for example by means of a pneumatic actuator. For this purpose, the actuator is connected via a regulating rod to an outside lever of the VTG.

The setting of the VTG is on the one hand realized by means of an end piece which is held in the set position by two lock nuts. It is also known for a knurled nut to be used for the height compensation of the actuator or of the control capsule, which knurled nut is subsequently secured by means of a lock nut.

The use of one or more lock nuts in exhaust-gas turbochargers such as are known for example from U.S. Pat. No. 6,895,947 B2 however has the disadvantage that the control capsule diaphragm can easily be twisted during the locking of the nut. Furthermore, an oblique position of the setting piece may easily arise.

BRIEF SUMMARY OF THE INVENTION

It is therefore an object of the present invention to provide a regulating rod by means of which the disadvantages of the prior art can be eliminated.

The regulating rod according to the invention combines the advantages of a knurled nut without the need to resort to the disadvantageous locking of the nut as explained above. This is because, after the setting of the control capsule play by means of the knurled nut, the set effective length of the rod part of the regulating rod can be secured in cohesive fashion by means of a fastening portion of the end piece. Here, "effective length" is to be understood to mean the length which, after the setting of the actuator and the fixing of the end piece, actively serves for transmission of force.

BRIEF DESCRIPTION OF THE SEVERAL VIEWS OF THE DRAWINGS

Further details, advantages and features of the present invention become apparent from the following description of an exemplary embodiment with reference to the drawing, in which.

DETAILED DESCRIPTION OF THE INVENTION

Figure 1:
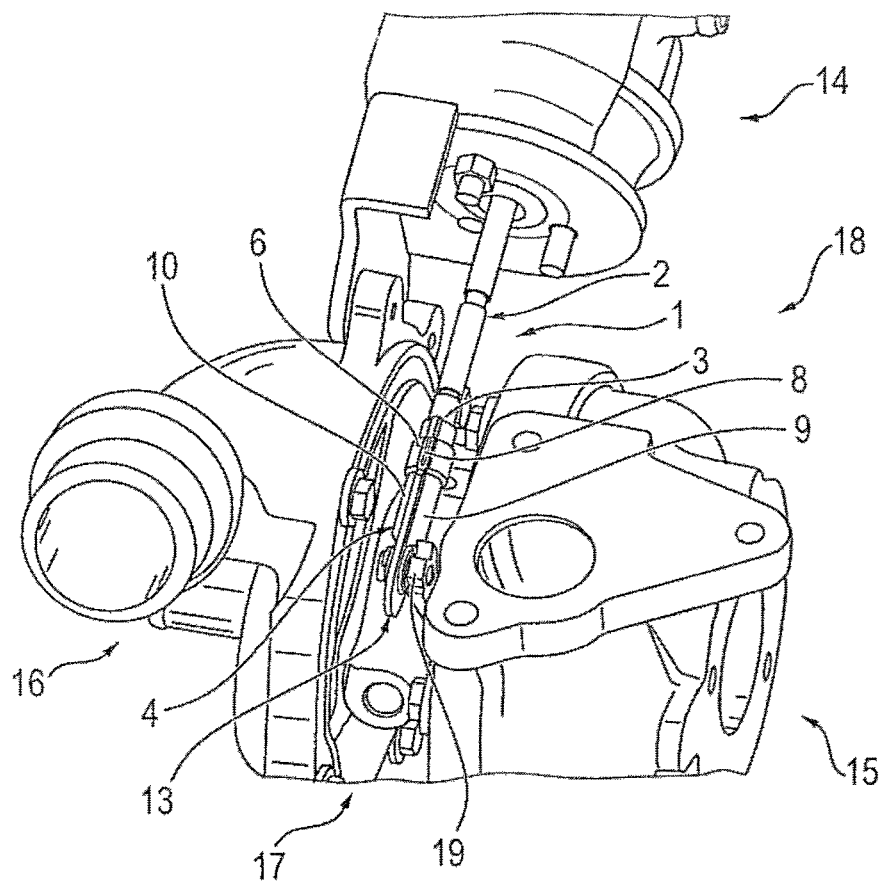
FIG. 1 is a perspective illustration of an exhaust-gas turbocharger according to the invention with a regulating rod according to the invention in an installed state.

FIG. 1 illustrates an exhaust-gas turbocharger 18 which has a compressor 16 and a turbine 15. A bearing housing 17 is arranged, in the conventional way, between the compressor 16 and the turbine 15.

The exhaust-gas turbocharger 18 is equipped with a variable turbine geometry, of which only an outside lever 19 is visible in FIG. 1. A variable turbine geometry of said type is understood to mean a structural unit which, between a vane bearing ring and a disk, delimits an inflow duct for the passage of exhaust gases to the turbine wheel of the turbine 15. A VTG of said type also has a multiplicity of vanes which are arranged in the inflow duct. The vanes can be moved rotatably in the vane bearing ring between a closed and an open position. For this purpose, the vanes have vane shafts which are connected to vane levers. Each vane lever in turn has a lever head which engages into an adjusting ring. For the adjustment of the vanes, the adjusting ring is actuated by means of an actuator 14, for example of a pneumatic control capsule. For this purpose, the control capsule 14 has a regulating rod 1. The regulating rod 1 has a rod part which, at the inner end not visible in FIG. 1, is connected to a diaphragm of the control capsule. The other end which is visible in FIG. 1, or the visible end region 3, is provided with an external thread, which external thread is however not illustrated in FIG. 1 because the end region 3 is screwed into an end piece 4.

Figure 2:
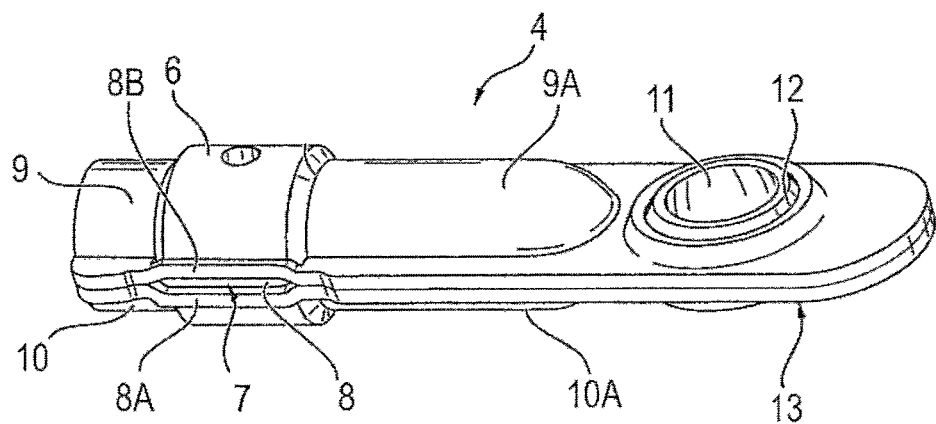
FIG. 2 shows a perspective view of an end piece of the regulating rod as per FIG. 1.
Figure 3:
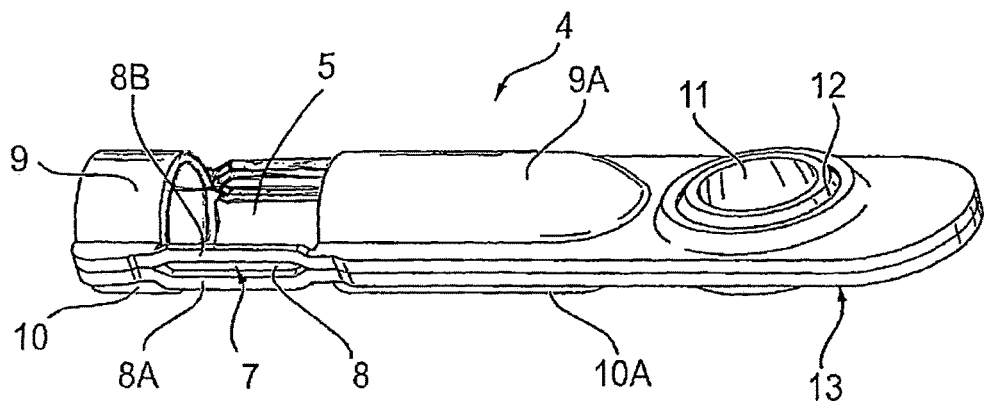
FIG. 3 shows end piece (4) with knurled nut (6) removed.
Figure 4:
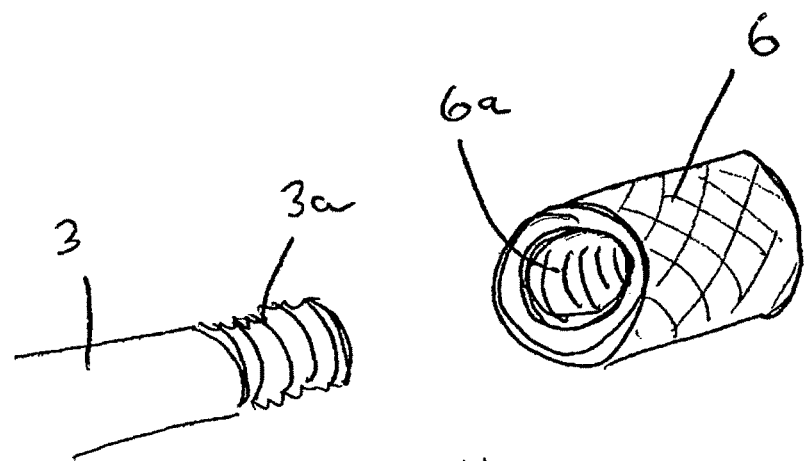
FIG. 4 shows the end (3) of the rod with external threading and knurled nut (6) with internal threading.

Said end piece 4 is shown in detail and in an enlarged illustration in FIG. 2. The end piece 4 is provided with a receiving recess 5 in which a setting piece, in the form of a knurled nut 6 in the example, is arranged and guided. The knurled nut 6 has an internal thread 6a into which the external thread 3a of the end region 3 of the rod part 2 can be screwed.

As can be seen in particular from the enlarged illustration of FIG. 2, the end piece 3 has a fastening portion 7. In the embodiment illustrated in FIGS. 1 and 2, said fastening portion 7 is formed by a weld window 8 which is delimited by two webs 8A and 8B which run parallel to one another and which merge into one another at their end regions.

FIGS. 1 and 2 show that said weld window 8 runs across the knurled nut 6.

The end piece 7 is assembled from two sheet-metal halves 9 and 10 which delimit a cavity for receiving the free end region 3 of the rod part 2. Said cavity is not visible in FIGS. 1 and 2 but forms a cylinder which is formed by the two semi-circular bulged regions 9A and 10A.

FIG. 2 in particular also shows that the end piece 4 is provided with a compensating ball joint 11 which is arranged in a receiving recess 12 of a flattened connection region 13 of the end piece 4. Said flattened connection region 13 adjoins the cylindrical cavity or the spherical regions 9A and 10A, as can be seen in detail from FIG. 2.

For the connection of the two sheet-metal halves, it is possible in principle to use any suitable type of connecting means. Particular preference is given to welded connections, brazed connections, riveted connections or else screw connections, or in principle also combinations of said connection techniques.

To set the VTG or the control capsule 14, the free end region 3 is screwed with its external thread 3a into the internal thread 6a of the knurled nut 6. The fine adjustment is then performed by actuation of the knurled nut 6. When the setting process is complete, the final position is fixed by means of the fastening portion 7. In the particularly preferred exemplary embodiment illustrated in FIGS. 1 and 2, this means that the weld window 8 is filled with weld filler such that the knurled nut 6 is non-detachably fixed.

By means of the additionally provided compensating ball joint 11, it is possible for an axial play of the control capsule to be ensured and the assembly of the arrangement as a whole to be facilitated.

In addition to the above written disclosure of the invention, reference is explicitly made to FIGS. 1 and 2 to supplement the disclosure of the invention.

LIST OF REFERENCE SIGNS

1 Regulating rod
2 Rod part
3 End region
4 End piece
5 Receiving recess
6 Setting piece
7 Fastening portion
8 Weld window
8A, 8B Webs
9 Sheet-metal half
9A Semi-circular sheet-metal half portion
10 Sheet-metal half
10A Semi-circular sheet-metal half portion
11 Compensating ball joint
12 Receiving recess
13 Connection region
14 Actuator (control capsule)
15 Turbine
16 Compressor
17 Bearing housing
18 Exhaust-gas turbocharger
19 Outside lever

What is claimed is:

1. A regulating rod (1) comprising:
a rod part (2) which has a free end region (3) provided with an external thread (3a);
an end piece (4) including a first sheet metal half (9) and a second sheet metal half (10) being joined together to form a seam and define a receiving recess (5), the receiving recess (5) having an opening at one end of the end piece (4), the opening being configured to receive the free end region (3) of the rod part (2) through the opening and into the receiving recess (5), the end piece (4) further including:
a knurled nut (6) disposed within the receiving recess (5) of the end piece (4), the knurled nut having an internal thread (6a), and
a weld window (8) being formed on the end piece being defined by, and in communication with, the seam and positioned adjacent the knurled nut (6), wherein a length of the regulating rod (1) is adjusted by a portion of the free end region of the rod part (2) being received in the receiving recess (5) of the end piece (4) through the opening of the end piece so that the external thread (3a) of the rod part (2) engages with the internal thread (6a) of the knurled nut (6), the knurled nut being rotated to further adjust the length so that the external thread is screwed into the internal thread (6a) of the knurled nut (6) to attain a set length for the regulating rod (1), and
when the set length of the regulating rod (1) is attained, further rotation of the knurled nut (6) is prevented by introducing and filling the weld window (8) with a weld filler such that the knurled nut (6) is non-detachably fixed and thereby the set length of the regulating rod (1) is fixed.

2. The regulating rod as claimed in claim 1, wherein the weld window (8) extends axially across the knurled nut (6).

3. The regulating rod as claimed in claim 1, wherein the end piece (4) has a compensating ball joint (11).

4. The regulating rod as claimed in claim 3, wherein the compensating ball joint (11) is arranged and guided in a receiving recess (12) in a flattened connection region (13) of the end piece (4).

5. The regulating rod as claimed in claim 1, wherein the first sheet metal half (9) and the second sheet metal half (10) are welded, brazed, riveted and/or screwed to one another.

* * * * *